United States Patent [19]

George

[11] 4,366,628

[45] Jan. 4, 1983

[54] INVERTABLE PAN CONVEYOR AND MATERIAL CARRYING PAN THEREFOR

[75] Inventor: Kurudamannil A. George, Philadelphia, Pa.

[73] Assignee: Proctor & Schwartz, Inc., Pa.

[21] Appl. No.: 251,386

[22] Filed: Apr. 6, 1981

[51] Int. Cl.³ ............................................. F26B 15/14
[52] U.S. Cl. ...................................... 34/207; 34/208; 198/561; 198/796
[58] Field of Search ............... 198/561, 706, 796, 802; 34/207, 208

[56] References Cited

U.S. PATENT DOCUMENTS

| | | | |
|---|---|---|---|
| 1,328,099 | 1/1920 | Parkes | 198/796 |
| 1,428,721 | 9/1922 | Towne | 198/561 |
| 1,768,534 | 7/1930 | Aiken | 34/208 |
| 3,229,378 | 1/1966 | Gerrish | 34/208 |

FOREIGN PATENT DOCUMENTS 944968 4/1949 France.
538728 12/1894 Ireland.
11097524 4/1968 United Kingdom.

*Primary Examiner*—Larry I. Schwartz
*Attorney, Agent, or Firm*—Robert A. Sturges; Merton H. Douthitt

[57] ABSTRACT

There is provided an endless conveyor characterized by a plurality of invertable material carrying pans. The invention is particularly concerned with simplified means for effecting inversion of the pans whereby both the upper and lower reaches of the endless conveyor may be utilized to carry material as for example in a dryer. Each of the material carrying pans is provided with a cam for coaction with stationary cam followers to effect inversion of the pan as it approaches the end of the conveyor for reversal of direction, and stabilizing cam followers for controlling the position the pan as it courses around the direction changing apparatus and enters another reach.

12 Claims, 8 Drawing Figures

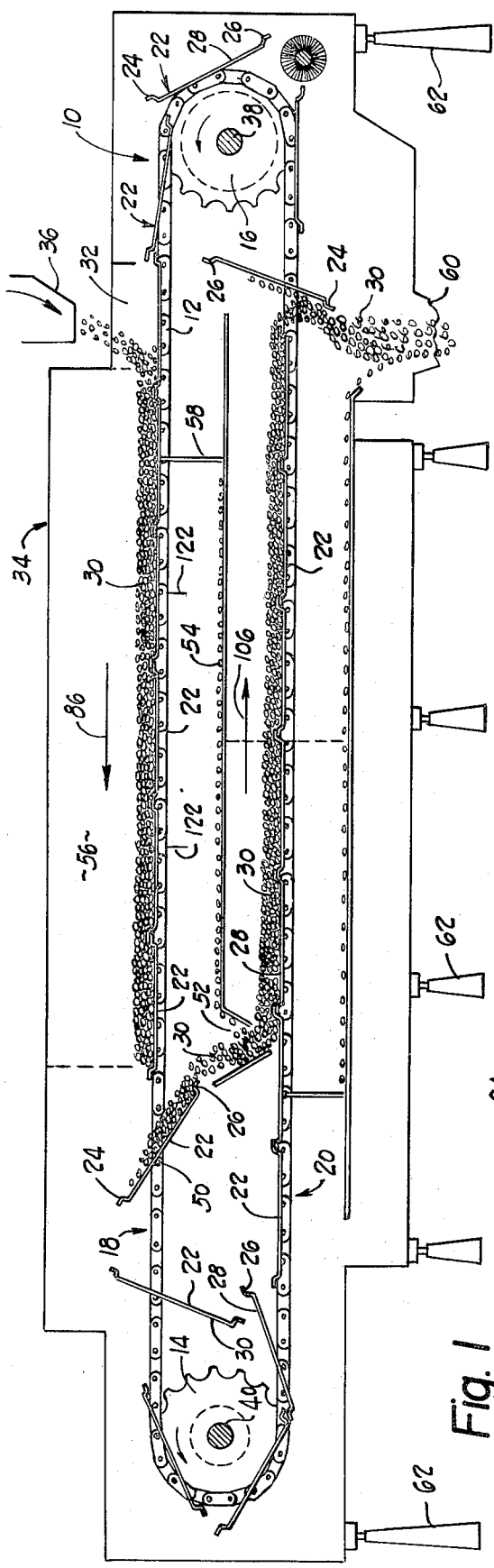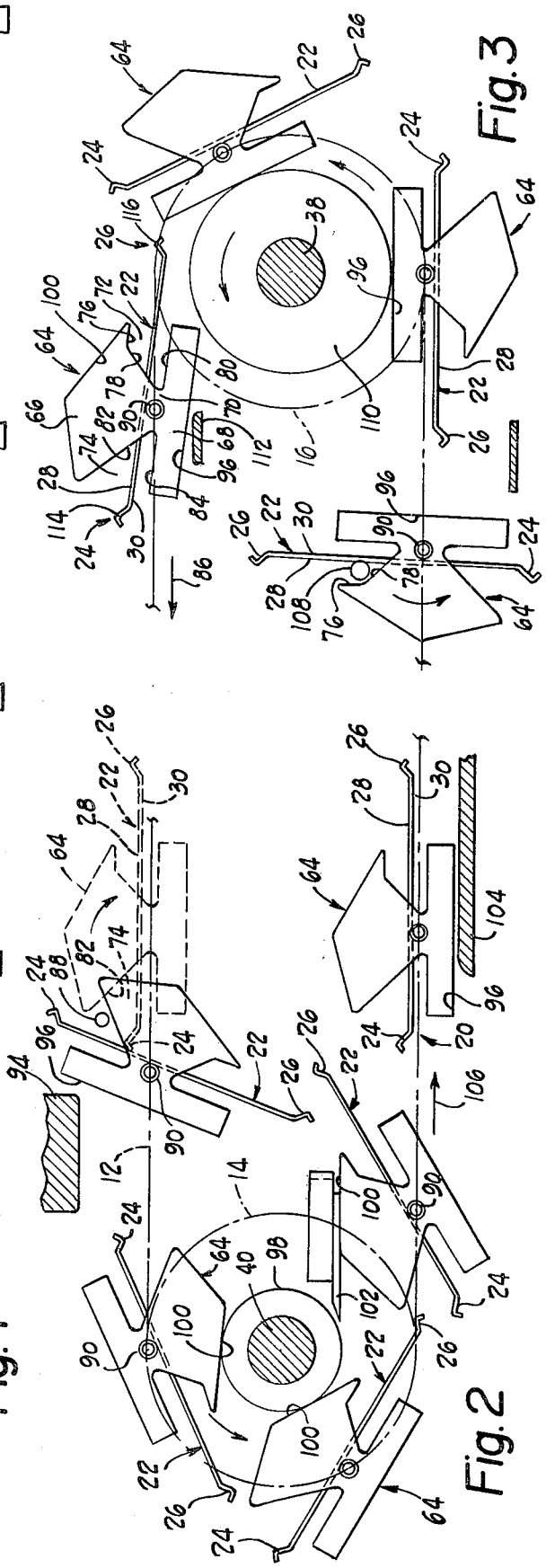

INVERTABLE PAN CONVEYOR AND MATERIAL CARRYING PAN THEREFOR

This invention relates to material handling conveyors, and more particularly to endless conveyors characterized by a plurality of invertable material carrying pans. The invention is especially concerned with simplified means for effecting inversion of the pans whereby both the upper and lower reaches may be used to carry material, as for example, in a dryer.

BACKGROUND OF THE INVENTION AND PRIOR ART

Inverting pan conveyors capable of carrying material in the forward and return directions are known and have been used in drying machinery. In such equipment material is transferred from pans traversing a superior reach and moving in one direction of an endless conveyor to pans traversing a lower reach and moving in the opposite direction. The transfer is effected during inversion of the material carrying pans whereby material, e.g., granular material, is cascaded from an upper level to a lower level and the direction of travel is reversed. Reference may be had to U.S. Pat. No. 1,328,099 to Parkes which shows such an apparatus. In the Parkes device, the pans undergo inverson so that the same material carrying surface is presented in both directions of travel.

Similar apparatus is shown in British Pat. No. 1,109,752 published Apr. 18, 1968, British Pat. No. 538,728 dated May 7, 1895 and in French Pat. No. 944,968 published Apr. 24, 1949. Each of these shows a plurality of flat pallets having overlapping members or portions, a trailing portion of one pallet underlying the leading portion of the next adjacent pallet. When the pallet escapes a stationary hold-down, the trailing edge drops in between parallel endless conveyor chains and discharges material carried thereby to the material carrying surface of preceding pallets which have coursed around a sprocket. These pallets do not, however, undergo inversion whereby the same material carrying surface is presented in both forward and return directions as in the case of Parkes device and in the present device. Parkes effects inversion of the pans by rotating them about a transverse pallet axis in the same direction of rotation as the sprocket rotation when the pallet is moving from the upper reach to the lower reach, and in a direction of rotation counter to the sprocket rotation when moving from the lower reach to the upper reach. Parkes accomplishes inversion by means of cams mounted on the underside of the individual pallets at both ends of the pallet and coacting with stationary cam guiding troughs or brackets 19 and 30, one of which brackets is the exact negative counterpart of the other, and located on opposite sides of the apparatus.

The present invention provides a simpler structure characterized by a simplified cam and cam guide or follower system. In operation, the present structure rotates the pallets or pans oppositely with respect to the sprockets from what is taught by Parkes. Like Parkes, a plurality of conveyors may be stacked one above another in a drying apparatus.

BRIEF STATEMENT OF THE INVENTION

Briefly stated, therefore, the present invention is in a conveyor and a material carrying pan therefor. The conveyor comprises an endless series of traveling material carrying pans adapted to course along substantially horizontal paths between, and then around terminal sprockets. Each pan has a single material carrying surface. Structure is provided for inverting the pans sequentially as they approach a terminal sprocket at the end of one reach of horizontal travel, and for reinverting the pans sequentially as they approach the other terminal sprocket. By such structure, material may be transferred from a superior reach traveling in one direction to a lower reach traveling in an opposite direction, i.e., from upper to lower reaches of the same endless conveyor, or from a lower reach of one conveyor to the upper reach of a next lower conveyor where a plurality of conveyors are stacked one above another.

Each of the pans is provided with a plate-like cam located at at least one end of the pan. The cam is provided with cam-follower edges for engaging spaced stationary pan-inverting cam followers located adjacent each reach and prior to the terminal sprocket in the direction of pan travel. The cams and cam followers coact to invert the pans sequentially on approach to the terminal sprocket to discharge material carried thereon for transfer to a lower traveling pan reach. To prevent spilling of material through the sprocket assembly, the material is discharged inwardly of the conveyor away from the sprocket.

The cams each comprise a first portion extending above and generally perpendicular to the plane of the material carrying surface of the pan and a second portion extending below the pan. The first and second portions define oppositely directed inwardly extending cam follower intercepting notches configured for inverting the pan. Thus, as the pan moves into engagement with a stationary pan inverting cam follower, the coaction of the cam notch with the follower inverts the pan prior to being carried around the sprocket by movement of the endless chain or chains.

In a more specific embodiment, means are provided concentric with the sprocket axle for coaction with other cam edges for stabilizing the pan as it turns around the sprocket and reverses its direction of travel.

BRIEF DESCRIPTION OF THE DRAWINGS

The invention may be better understood by having reference to the annexed drawings illustrating a preferred embodiment of the invention and wherein:

FIG. 1 is a side elevation, partially in cross-section, and with an enclosing sidewall removed for better showing, of a preferred embodiment of the invention.

FIG. 2 is a diagrammatic, fragmentary side elevation on an enlarged scale illustrating one terminal sprocket and showing material carrying pans undergoing inversion prior to changing direction around a terminal sprocket and showing the coaction between the cam, shown in elevation, and various cam followers encountered in inversion, direction of travel change, and entry into the lower reach of an endless conveyor.

FIG. 3 is a diagrammatic, fragmentary side elevation on the same scale as FIG. 2 illustrating the other terminal sprocket and showing pans undergoing inversion, direction of travel change, and entry into the upper reach of the endless conveyor of FIG. 2.

DETAILED DESCRIPTION OF THE DRAWINGS

Figure 4:
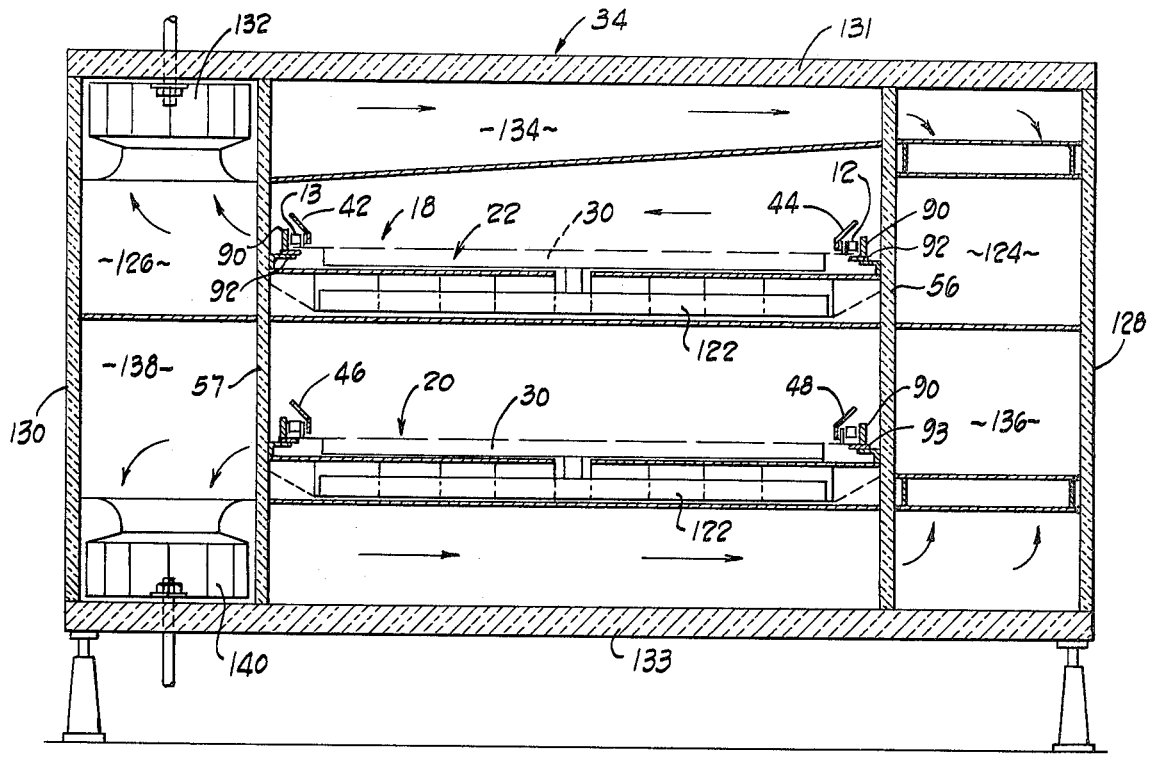
FIGS. 4 and 5 are end elevations in cross-section showing a conveyor in a dryer environment and illustrating, respectively, different transverse air flow arrangements and baffling to control air flow.

Referring now more particularly to FIG. 1, there is here shown in side elevation with a side cover plate removed for better visibility, a conveyor for drying granular materials such as food products, grains, cereals, tea, coffee, etc. Accordingly, there is shown an endless conveyor generally indicated at 10 having a link chain 12 adapated for coursing around terminal sprockets 14 and 16 to provide an upper reach moving from right to left as shown in FIG. 1, and a lower reach 20 moving from left to right. The endless link chain 12 has pivotally mounted thereon at spaced intervals material carrying pans 22. Each of the pans 22 is provided with a configured transversely extending leading edge 24 and a correspondingly configured parallel transversely extending trailing edge 26 defining therebetween a material carrying surface 28, and a bottom surface 30. The leading edge 24 of each pan 22 is adapted to overlie the trailing edge 26 of the next preceding pan 22. As diagrammatically illustrated in FIG. 1, a granular material 30 is deposited through an inlet 32 in the enclosure 34. The granular material 30 may be introduced through a hopper 36 leading from a storage source not shown, or from a superimposed conveyor constructed like that shown diagrammatically in FIG. 1. The reaches 18 and 20 are generally horizontally disposed, although angular disposition relative to the horizontal may be tolerated if within the limits of the angle of repose of the material 30. Generally, however, the apparatus is disposed such that the upper reach 18 and the lower reach 20 are horizontal. Sprockets 14 and 16 are mounted on spaced shafts 38 and 40, and one of the shafts is driven by any suitable drive means, such as an electric motor directly coupled to the shaft, for example, shaft 38 or indirectly linked thereto for example through a chain and sprocket drive, not shown.

As will be explained in greater detail in connection with the discussion of FIGS. 2 and 3, the pans 22 travel from the location of material inlet 32 toward the terminal sprocket 14. Prior to reaching the terminal sprocket 14, a pan 22 is released from constraining side rails, such as side rails 42, 44, 46 and 48 as shown in FIG. 4, and because of the off-center disposition of the pivot axis indicated at 50 in FIG. 1, the trailing edge 26 drops thereby discharging the granular material 30 for entry into a hopper mouth 52 located intermediate the upper reach 18 and the lower reach 20, and between the terminal sprockets 14 and 16 for discharge onto the material carrying pans 22 moving in the opposite direction along the lower reach 20 as shown in FIG. 1. The hopper 52 is located at the downstream end of an intermediate fines collecting table 54 positioned between the upper and lower reaches 18 and 20, respectively, and supported by side walls of the apparatus such as the side wall 56, the opposite side wall member having been removed for visibility as above indicated. The purpose of the intermediate table 54 is to collect fines and dislodged granular material that falls through the upper reach of travel. One or more of the pans 22 may be provided with a drag flight 58 for periodically sweeping the table 54 of collected granular material and fines, for deposit in the hopper 52 and ultimate transfer to the lower reach 20 as shown in FIG. 1.

After depositing the granular material from the material carrying surface thereof, the pan 22 is fully inverted, and then begins to change its direction as it moves around the sprocket 14 in a counter-clockwise direction. When the inverted pans 22 emerge from the underside of the direction reversing means including the sprocket 14, the material carrying side 28 is again in an upward condition, and the former trailing edge 26 now becomes a leading edge 26 as it traverses the lower reach 22. The pans 22 then course beneath the outlet of the hopper 52 where granular material is cascaded onto the material carrying surface 28, and the granular material therein exposed to warm air or other gas for drying, or, if desired, chemical reaction purposes. As the material carrying pans 22 approach the terminal sprocket 16, they are again released from confining guide rails, such as guide rails 46 and 48 (FIG. 4), and by operation of a cam follower as hereinafter more particularly described, are again inverted prior to having their direction of travel reversed by coursing around the direction reversing means including terminal sprocket 16.

The individual pans may be a number of feet wide, e.g., up to 10 feet or more, for example, and accordingly it is desirable to have parallel chain and sprocket assemblies, only one of which is shown in FIG. 1. As the pans 22 are inverted, the material 30 carried thereby is again cascaded in response to gravity for discharge through an outlet 60 which may lead to a storage bin, another conveyor, or a lower dryer apparatus such as that shown in FIG. 1.

The apparatus in FIG. 1 is conveniently mounted on supporting piers, such as the piers 62 which may be adjusted for substantial horizontal disposition of the reaches 18 and 20.

Referring now more particularly to FIGS. 2 and 3, there is here shown in partially schematic and diagrammatic form and on an enlarged scale, the inversion mechanism in advance of each direction reversing system for the terminal sprockets 14 and 16, respectively.

Each of the material carrying pans 22 is provided at at least one end with a vertically disposed cam plate generally indicated at 64. The cam plate 64 is composed of a first portion 66 and a second portion 68. The first portion 66 lies for the most part above the plane of the material carrying surface 28, and the second portion lies for the most part below the plane of the material carrying surface 28. The first and second portions are joined together at a neck portion 70 and define between them oppositely directed inwardly extending cam follower intercepting notches 72 and 74. The notch 72 is defined by cam follower engaging edges 76, 78 and 80. The cam follower engaging notch 74 is defined by cam follower engaging edges 82 and 84. For certain purposes, as for example where the transverse dimension is large, it will be found convenient to provide similar cams at each end of the pan 22 and mount corresponding cam followers adjacent the opposite side.

As the pan 22 carrying the cam member 64 moves along the upper reach 18 in the direction indicated by the arrows 86, the leading cam engaging notch 74 engages a cam follower 88 (FIG. 2). The coaction between the cam follower 88 and edge 82 of the notch 74 causes the pan 22 to be rotated about its off-center roller 90 riding on horizontally extending rail 92 (FIG. 4) to drop the underlying trailing edge 26 now released from stationary side rail 44 and effect discharge the granular material 30 into the hopper mouth 52 as above described. Stationary cam follower 94 is positioned for coaction with the bottom cam follower engaging edge 96 to assist in inverting the pan 22, and preparing its attitude for entry into the direction reversing apparatus including the sprocket 14.

The sprocket 14 (FIG. 2) has associated and concentrically mounted therewith a circular cam follower 98 which is dimensioned for coaction with the upper cam follower engaging edge 100 on the first portion of the cam 64. Engagement of the edge 100 with the disc 98 stabilizes the pan 22 against uncontrolled pivoting about the roller 90 which is now free of the end of horizontally extending rail 92.

As the pan 22 exits from the lower side of the direction reversing apparatus including the sprocket 14, and the disc 98, the upper cam follower engaging edge 100 is intercepted by the stationary cam follower 102 and guided without rotation about the roller 90 until the roller 90 engages the rail 92 (FIG. 4). The cam 64 then engages a horizontally disposed cam follower 104 with its lowermost cam follower engaging edge 96 and thereby stabilized in a horizontal position with the material carrying surface in an upward position and capable of receiving material 30 deposited thereon through the hopper 52 as shown in FIG. 1.

As the pans 22 proceed in the direction of the arrows 106 toward the direction reversing assembly including sprocket 16, the former leading edge 24 now becomes the trailing edge 24 and the former trailing edge 26 now becomes the leading edge 26 as shown in FIG. 2. The pans now enter a second inverting station just prior to the other direction reversing operation. The inverting station is characterized by a cam follower or pin 108 which is positioned for intercepting the cam edges 76 and 78 and effects pivoting of the pan 22 whereby the material is discharged as shown in FIG. 1, and the material carrying surface 28 is turned upside down.

This causes the bottom edge 96 of the second portion 68 to assume a position for coaction with concentrically mounted disc cam follower 110 to stabilize the pan 22 as it reverses its direction in turning counter-clockwise around sprocket 16 in response to the movement of the chain. The attitude of the pan 22 may be conveniently stabilized by means of a stationary cam follower 112 positioned for coaction with the bottom surface 96 of the second portion 68. At this point, the roller 90 is in position for entry onto the upper horizontally disposed rail 92. Material 30 cascaded from the hopper 36 loads the pan 22 with material 30 for passage through the dryer. As shown in FIGS. 2 and 3, the leading edge 24 is configured as an inverted angle by displacement of an edge portion 114 out of the plane of the pan 22 in an upward direction. The cross sectional configuration of the edge portion 24 may be angular as shown in FIG. 3, or circular, or any other convenient cross section. It should be configured however, the same as the trailing edge 26 which is also formed by displacement of an edge portion 116 out of the plane of the pan 22 in the same direction. The inner surface of the leading edge portion 24 should engage and fit tightly in nested relation with the outer surface of the trailing edge portion 26 in an overlapping relation on the upper reach 18.

In like manner, the inner surface of the trailing edge 26, which becomes the leading edge on the lower reach 20, is configured for nesting relationship with the outer surface trailing edge 24. For convenience, the displacements form an angle which is the same for the trailing edge 26 as it is for the leading edge 24. These displacements extend transversely from one end of the pan 22 to the opposite end, the leading edge being parallel to the trailing edge and defining together with the ends 118 and 120 (FIG. 6) a rectangular flat plate.

Figure 5:
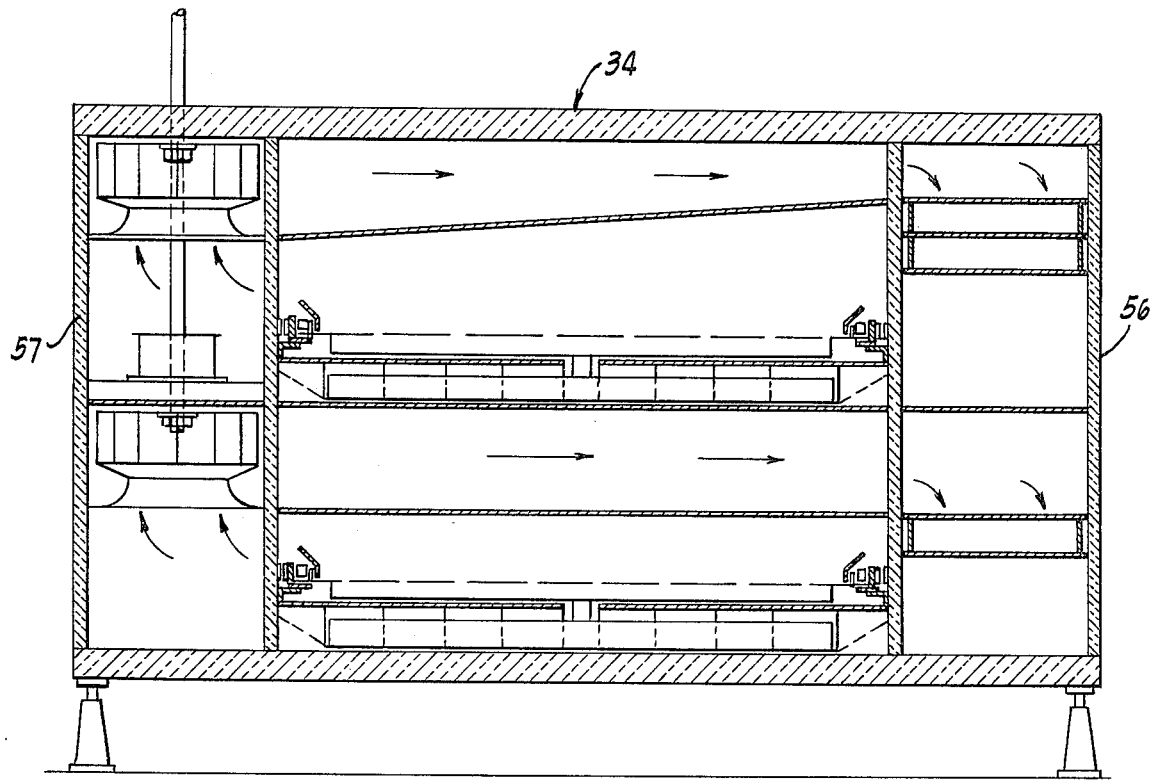

As shown in FIGS. 1, 4 and 5, each of the pans 22 is desirably provided with a girth beam 122 centrally mounted and depending from the underside of the pan. The girth beam 122 is particularly advantageous where the tranverse span of the pan 22 is in excess of 2 or 3 feet, e.g., 6 to 10 feet. The drag flight 58 (FIG. 1) may be utilized in place of the girth beam 122 on one or more of the pans 22. Girth beams 122 are not shown in FIGS. 2 and 3.

Referring now more particularly to FIGS. 4 and 5, there is shown an enclosure or a housing 34 having vertically extending side walls 56 and 57. The housing 34 is configured for use of the apparatus shown in FIG. 1 as a dryer. In this configuration, the pan 22 is mounted on rollers 90 at each end of the pan 22 for coaction on rail upper rails 92 for guiding the pans. The endless chains 12 and 13 on opposite sides of the pan 22 causes the pans to move in response to movement of the chains 12 and 13 around the sprockets 14 and 16. Plenum chambers 124 and 126 are defined by the inner walls 56 and 57, respectively, and the outer walls 128 and 130, respectively, top 131 and bottom 133. Serving the upper reach 18, there is provided a fan 132 which forces the drying gas through an upper chamber 134 and through plenum 124 and over the granular material 30 to effect drying thereof. Moist air is forced into the plenum chamber 126 and either exhausted or recirculated. In a similar manner there are provided plenum chambers 136 and 138 served by rotary fan 140 for circulating air across the lower reach 20 to effect drying of the granular material 30. It will be observed that in this embodiment of a dryer, the air passes transversely to the direction of travel of the material as it rests on the upper and lower reaches 18 and 20, respectively. If it is desired to flow the air cocurrently or countercurrently with the direction of flow of the material, suitable baffles and fans may be provided for these purposes.

FIG. 5 shows a different embodiment for conducting drying air through in contact with the material 30 on the pans 22.

Figure 6:
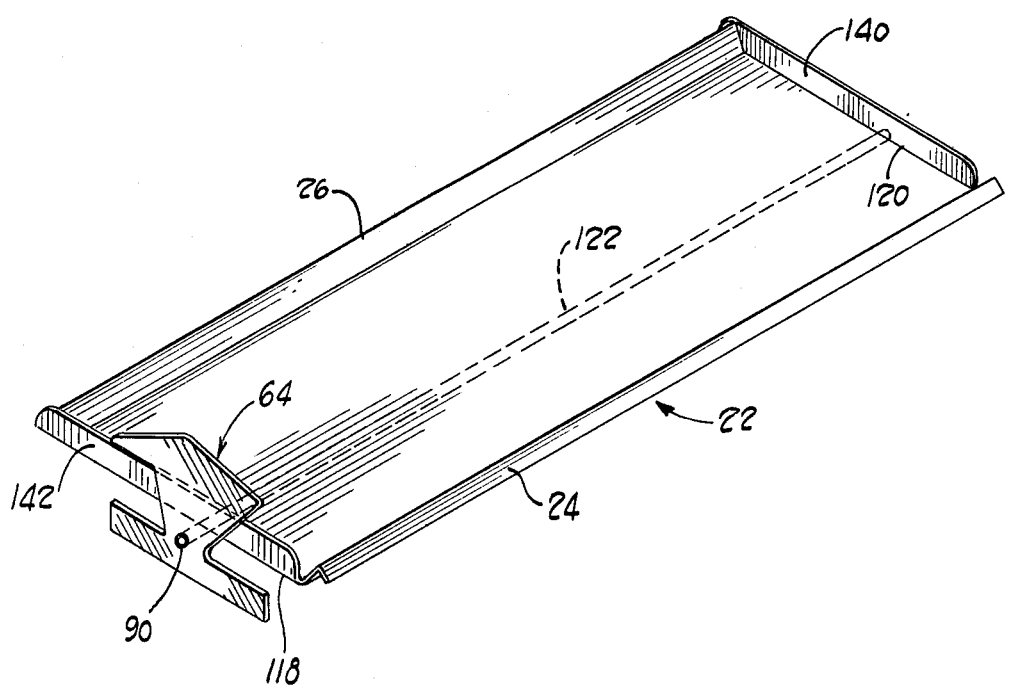
FIG. 6 is a perspective illustration of a preferred material carrying pan in accordance with this invention.

Referring now more particularly to FIG. 6, there is here shown in perspective, and on an enlarged scale, a material carrying pan 22. As shown in FIG. 6, the pan 22 has a generally rectangular configuration having parallel opposite edges. The longer edges 24 and 26 correspond to the leading and trailing edges respectively of the pan as it rests on the upper reach 18 (FIG. 1). For convenient coaction with the hold down rail 42 and 44, the end may be provided with upstanding flanges 140 and 142 to facilitate coaction with the stationary side rails 44 and 42, respectively. It is longitudinal termination of the stabilizing side rails 44 and 42 that permits the pan 22 to tilt about the roller 90 to discharge the granular material 30 carried thereby. Also is shown in FIG. 6, in dotted lines the axis of the roller 90 is displaced towards the leading edge 24 and away from the trailing edge 26 and parallel to each.

Figure 7:
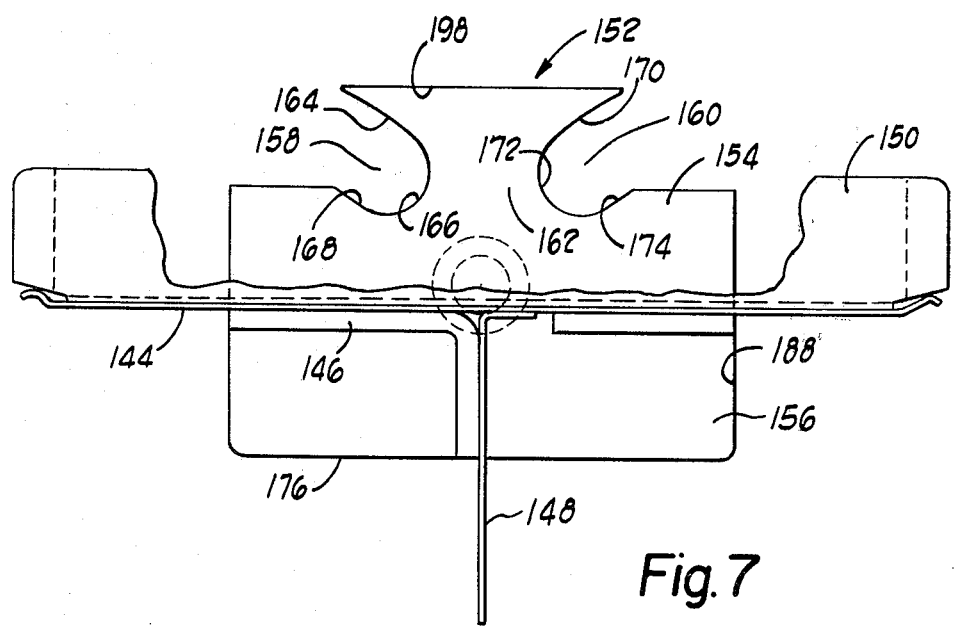
FIG. 7 is an end view on an enlarged scale, partially cut away, showing another form of cam device useful in accordance with this invention.

Referring now more particularly to FIG. 7, there is here shown an end view of a material carrying pan fitted with a cam which is somewhat simpler in design and construction than that shown in the previous figures. Accordingly, this is a preferred structure. There is shown a material carrying pan 144 having an L shape girth beam 146 welded to the bottom of the pan 144. In the embodiment shown in FIG. 7, there is also provided a drag flight 148 for coaction with a Table 54 such as shown in FIG. 1. As shown in FIG. 7, the far end of the material carrying plate is provided with an upstanding flange 150 which has been partially cut away to show the cam plate 152. The cam 152, like the cam plate 64 is composed of an upper first portion which lies generally above the plane of the material carrying pan 144 and a lower second portion 156 lying below the plane of the pan 144. The upper portion 154, is provided with first and second cam follower intercepting notches 158 and 160 which are generally inwardly and downwardly directed to define a neck portion 162 therebetween. The notch 158 is defined by cam follower engaging edges 164, 166 and 168. The notch 160 is likewise defined by cam follower engaging edges 170, 172 and 174. The configuration of the notches 158 and 160 is such that they are substantially mirror images of each other. Thus, the structure is considerably simpler than the structure shown in FIG. 6, for example.

Figure 8:
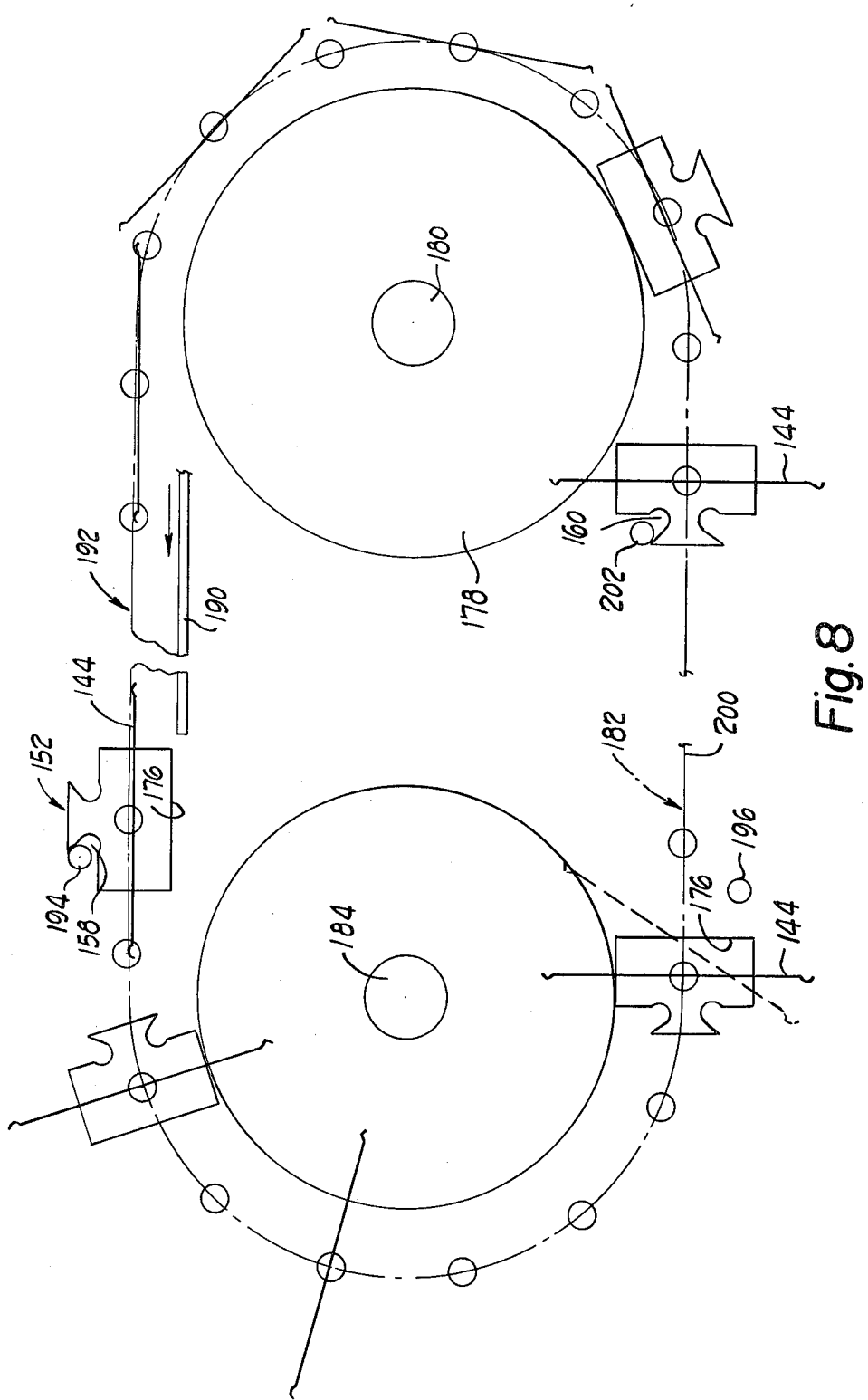
FIG. 8 is a diagrammatic, fragmentary side elevation illustrating terminal sprockets and showing material carrying pans unergoing inversion prior to changing direction around a terminal sprocket.

The lower or second portion of the cam 156 lying below the surface of the pan 144 is generally rectangular in shape and provided with a cam follower engaging edge 176 which is adapted to engage a circular disc cam follower 178 mounted on a sprocket shaft 180 (FIG. 8). At the opposite end of the endless belt generally indicated at 182, another sprocket is provided in a manner like that shown in FIG. 1 for reversing the direction of the belt therearound and mounted on a shaft 184. This shaft also carries a disc cam follower which is located and dimensioned for coaction with the cam follower engaging edge 188. In all other respects, the structure is the same as that shown in FIG. 6.

The mode of operation of the improved pans shown in FIG. 7 is substantially identical with the mode of operation of the pan shown in FIG. 6 and more particularly shown in FIGS. 1, 2 and 3. A stationary cam follower 190 may be provided for additional stabilization of the pans 144 as they travel along the upper course or reach 192 of the endless belt. This cam follower coacts with the cam follower engaging edge 176 of the cam 152 as shown in FIG. 8. The cam 152 in FIG. 8 is shown just coming into contact with a stationary cam follower 194 which by coaction with the notch 158 causes the pan 144 to be inverted as shown in FIG. 8. A lower cam follower 196 is positioned and located for contact with the cam follower engaging edge 176 as the pan 144 leaves the bottom side of the sprocket mounted on sprocket shaft 184 (FIG. 8) to right the pan for entry into the lower reach 200 of the endless belt 182. In like manner, the stationary cam follower 202 is positioned and located for coaction with the notch 160 to reinvert the pan 144 as the belt moves along the lower reach 200 and just prior to entry into the direction reversing apparatus which is mounted on the sprocket shaft 180, in the same manner as shown in FIG. 1.

In FIG. 8, only the key material carrying pans 144 are shown, it being understood that a full compliment of material carrying pans 144 will be provided in a complete apparatus. Such a complete apparatus is as shown in FIG. 1 with the exception that the material carrying pans are of a structure such as shown in FIG. 7 rather than as shown in FIG. 6.

What is claimed is:

1. A conveyor comprising a horizontally arranged series of traveling material carrying pans adapted to course between and around terminal sprockets, each said pan having a single material carrying surface, means for inverting said pans sequentially as they approach a terminal sprocket at the end of one reach of horizontal travel, said pans being reinverted in sequence as they approach the other terminal sprocket, said pan inverting means including a vertically disposed plate-like cam located at an end of each of said pans, said plate-like cam comprising a first portion extending above the material carrying surface of the pan and a second portion coplanar with said first portion and extending below said pan, said first and second portions including oppositely inwardly extending cam follower intercepting notches defined by cam follower engaging edges, for engaging spaced stationary pan-inverting cam followers located adjacent each reach and prior to the terminal sprocket in the direction of pan travel, said cam and cam followers configured for and coacting respectively to invert said pans sequentially on approach to said terminal sprocket in response to pan inverting engagement between a said notch and a cam follower during movement in the direction of travel along a reach of horizontal travel, to discharge material carried on said material carrying surface for transfer to a lower traveling pan moving in the opposite direction on a lower reach, said discharge being in a direction inwardly of the sprockets and toward a point intermediate said sprockets.

2. A conveyor as defined in claim 1 wherein each of said sprockets includes a coaxially mounted cam follower, and each of said first portions includes an upper edge surface for coaction with one of said coaxially mounted cam followers, and each of said second portions includes a lower edge surface for coaction with the other of said coaxially mounted cam followers said upper and lower edge surfaces coating respectively with said coaxially mounted cam surfaces to guide said pan around said respective terminal sprockets.

3. A conveyor as defined in claim 1 wherein each of said pans is provided with a girth beam secured to the underside of said pan.

4. A conveyor as defined in claim 1 wherein said conveyor is provided with an intermediate stationary floor disposed between said superior and said lower reaches of said endless conveyor for catching fines and disloged particles carried on said pans moving along said superior reach and wherein at least one of the pans on said endless conveyor is provided with a girth beam having a vertical extent sufficient to contact the surface of said stationary floor to sweep fines and dislodged particles therefrom for cascading onto the pans moving along said lower reach.

5. A conveyor as defined in claim 1 also including means for moving a gaseous medium across and in contact with material carried by said pans.

6. A conveyor as defined in claim 5 wherein the means for moving a gaseous medium is constructed and arranged to move said gaseous medium generally perpendicular to the direction of movement of the pans on said conveyor.

7. A conveyor as defined in claim 1 wherein said pans are carried by parallel chains, each pan having pivotally mounted for rotation about an axis which with respect to the direction of travel on the superior reach is forward of the transverse centerline of said pan whereby the trailing edge of said pan tends to rotate downwardly when moving along the superior reach of said endless conveyor.

8. An invertable material carrying pan for an endless conveyor comprising a rectangular plate having a material carrying surface adapted to be pivotally supported by and between parallel endless chains for movement along a generally horizontal path, said plate having a leading edge and a trailing edge, each of said edges including a marginal portion displaced out of the plane of said plate toward the same side of the plate and being configured for nesting coaction with the opposite confronting marginal portion of an adjacent pan during travel along said generally adjacent pan during travel along said generally horizontal path, said plate having a vertically disposed plate-like cam at at least one end thereof, said cam having cam follower engaging edges for engaging stationary pan-inverting cam followers, said cam comprising a first portion extending above said material carrying surface and a second portion extending below said material carrying surface, said first and second poritons defining oppositely directed inwardly extending cam follower intercepting notches configured for inverting said pan in response to pan inverting engagement with an inverting cam follower during movement along said horizontal path, and said first portion including an upper edge surface having a generally triangular configuration and adapted for coaction with pan attitude controlling cam follower means and said second portion including a bottom edge surface adapted for coaction with other pan attitude controlling cam follower means.

9. An invertable material carrying pan as defined in claim 8 wherein said bottom edge surface is a straight line edge surface.

10. An invertable material carrying pan as defined in claim 8, said pan being additionally characterized by a girth beam extending between opposite ends of said pan.

11. An invertable material carrying pan as defined in claim 10 wherein said girth beam is disposed on the underside of said pan.

12. A invertable material carrying pan as defined in claim 8 including an axially mounted shaft for pivotally supporting said pan, the axis of said shaft being displaced in a direction forward of the transverse centerline of said pan when said pan is carried on a superior reach of an endless conveyor.

* * * * *

UNITED STATES PATENT AND TRADEMARK OFFICE
CERTIFICATE OF CORRECTION

PATENT NO. : 4,366,628

DATED : January 4, 1983

INVENTOR(S) : Kurudamannil A. George

It is certified that error appears in the above-identified patent and that said Letters Patent are hereby corrected as shown below:

Column 8, line 64, change "having" to --being--.

Signed and Sealed this

Fifteenth Day of March 1983

[SEAL]

Attest:

Attesting Officer

GERALD J. MOSSINGHOFF

Commissioner of Patents and Trademarks